(12) United States Patent
Watte

(10) Patent No.: US 8,799,400 B2
(45) Date of Patent: Aug. 5, 2014

(54) SYSTEM AND METHOD FOR MANAGING MULTIPLE QUEUES OF NON-PERSISTENT MESSAGES IN A NETWORKED ENVIRONMENT

(75) Inventor: Jon Watte, Redwood City, CA (US)

(73) Assignee: IMVU, Inc., Mountain View, CA (US)

( * ) Notice: Subject to any disclaimer, the term of this patent is extended or adjusted under 35 U.S.C. 154(b) by 157 days.

(21) Appl. No.: 13/019,505

(22) Filed: Feb. 2, 2011

(65) Prior Publication Data

US 2012/0198004 A1  Aug. 2, 2012

(51) Int. Cl.
  *G06F 15/16*  (2006.01)
(52) U.S. Cl.
  USPC ............................ 709/215; 709/206; 719/314
(58) Field of Classification Search
  CPC . H04L 12/56; H04L 49/9078; H04L 61/1511; H04L 47/2441; H04L 69/22; H04L 12/5693; H04L 47/30; H04L 49/9042
  USPC .......................................... 709/206; 719/314
  See application file for complete search history.

(56) References Cited

U.S. PATENT DOCUMENTS

| 6,104,719 | A  | * | 8/2000 | Chang et al. ................... | 370/428 |
| 7,856,461 | B2 | * | 12/2010 | Venkatesan et al. .......... | 707/953 |
| 7,969,884 | B1 | * | 6/2011 | Venables et al. .............. | 370/235 |
| 8,027,694 | B2 | * | 9/2011 | Carey et al. .................... | 455/466 |
| 8,144,632 | B1 | * | 3/2012 | Chapweske et al. .......... | 370/261 |
| 2004/0088401 | A1 | * | 5/2004 | Tripathi et al. ................ | 709/224 |
| 2004/0240462 | A1 | * | 12/2004 | T V et al. ....................... | 370/432 |
| 2005/0267941 | A1 | * | 12/2005 | Addante et al. ............... | 709/206 |
| 2011/0099291 | A1 | * | 4/2011 | O'Reirdan et al. ........... | 709/238 |

\* cited by examiner

*Primary Examiner* — Patrice Winder
*Assistant Examiner* — Eyob Hagos
(74) *Attorney, Agent, or Firm* — Inventive Patent Law P.C.; Jim H. Salter

(57) ABSTRACT

A system and method for managing multiple queues of non-persistent messages in a networked environment are disclosed. A particular embodiment includes: receiving a non-persistent message at a gateway process, the message including information indicative of a named queue; mapping, by use of a data processor, the named queue to a queue node by use of a consistent hash of the named queue; mapping the message to a queue process at the queue node; accessing, by use of the queue process, a list of subscriber gateways; and routing the message to each of the subscriber gateways in the list.

21 Claims, 11 Drawing Sheets

Message Processing

Message Queue System

Message Queue

Message Queue

Hash Processing

Message Processing

Hot Add Node Processing

SYSTEM AND METHOD FOR MANAGING MULTIPLE QUEUES OF NON-PERSISTENT MESSAGES IN A NETWORKED ENVIRONMENT

TECHNICAL FIELD

This application relates to a method and system for use with networked entities, according to one embodiment, and more specifically, for managing multiple queues of non-persistent messages in a networked environment.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009-2011 IMVU Corporation, All Rights Reserved.

BACKGROUND

The use of chat or instant messaging communications in a networked computer environment is well known. The America Online™ Instant Messaging system (AIM) is one well known system for controlling instant messaging in a networked environment. In these prior art systems, two computer users can communicate non-persistent text messages in real time using an instant message (IM) client on their computers in concert with an IM server.

Most messaging services are subscription-based or user-identity-based and may generate large numbers of content followers or users of particular message or content sources (denoted herein as subscribers). These content followers or subscribers can form communities or social networks around a particular content source or content distribution system. Social networks have gained in popularity as people have used messaging as a basis for connecting with each other.

As the numbers and size of the user pool, subscribers, and social networks expand, it becomes more difficult to track and manage the subscribers, the listening users, and the degree to which the users are involved with the message content. Similarly, it becomes more difficult to identify and rank the most popular content items being consumed across a variety of content sources and social networks.

Thus, a system and method managing multiple queues of non-persistent messages in a networked environment are needed.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

DESCRIPTION OF VARIOUS EXAMPLE EMBODIMENTS

Figure 1:
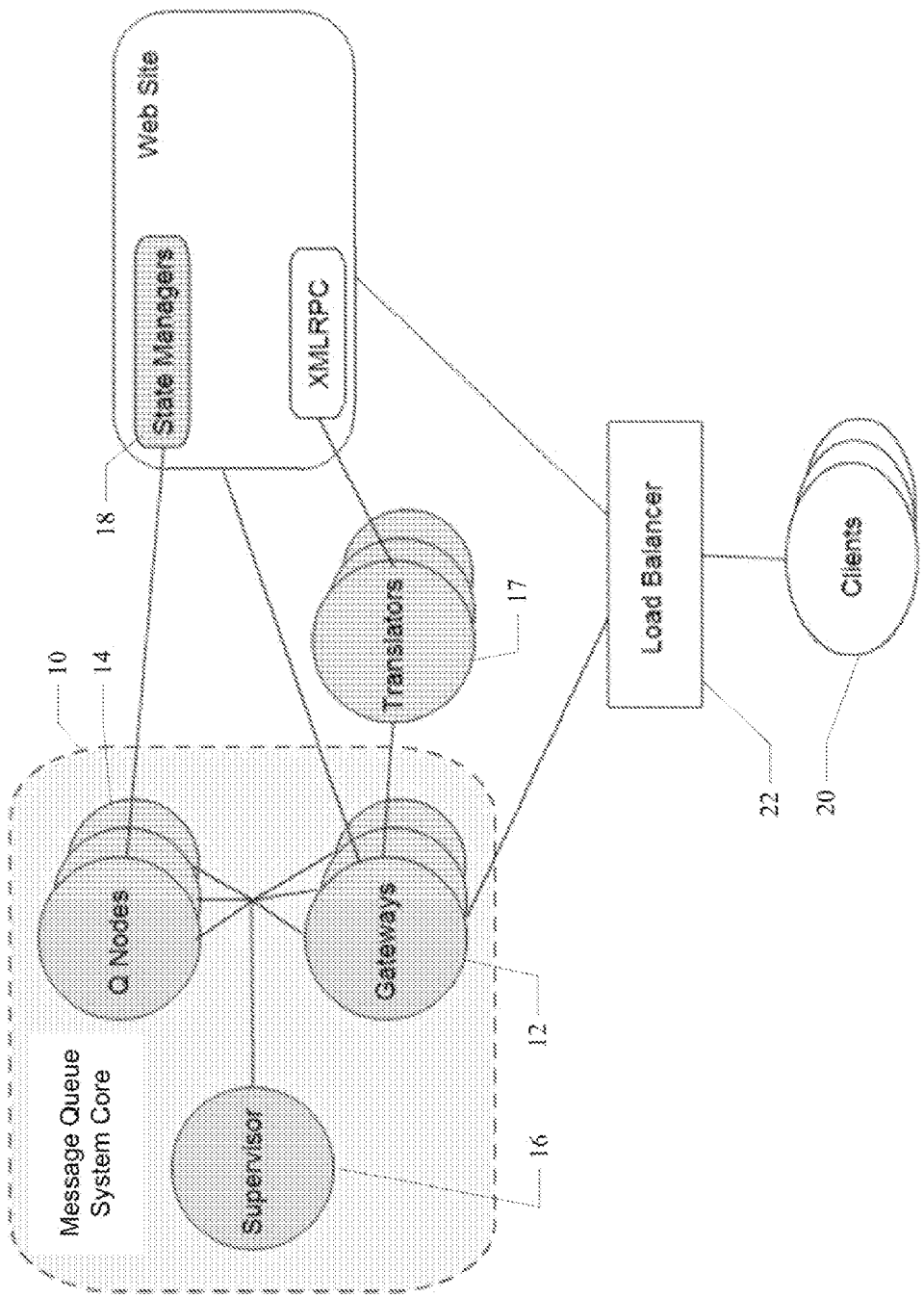
FIG. 1 illustrates the components of the Message Queue system of an example embodiment.

The Message Queue system of a particular embodiment is a stand-alone software stack, which implements a scalable, efficient, secure, flexible and easily understood message and state update switching and routing fabric. The Message Queue system is a robust, scalable message queue system to which clients connect that routes messages from the site to clients. The Message Queue system can also be considered a light-weight message queue system and state management protocol optimized for real-time interactive multi-player systems. FIG. 1 illustrates the components of the Message Queue system of an example embodiment. In an example embodiment, the core Message Queue system 10 comprises three main roles: Client Gateway(s) 12, Message Queue Node(s) 14, and Queue Management 16. These are loosely referred to herein as "Gateway," "Queue Node," and "Supervisor" or "Boss" respectively. A "node" is generally any of the machines running as part of the Message Queue system. Note that a "node" as used herein is not the same as a "queue node." A queue node may be one of many possible types of nodes.

Figure 2:
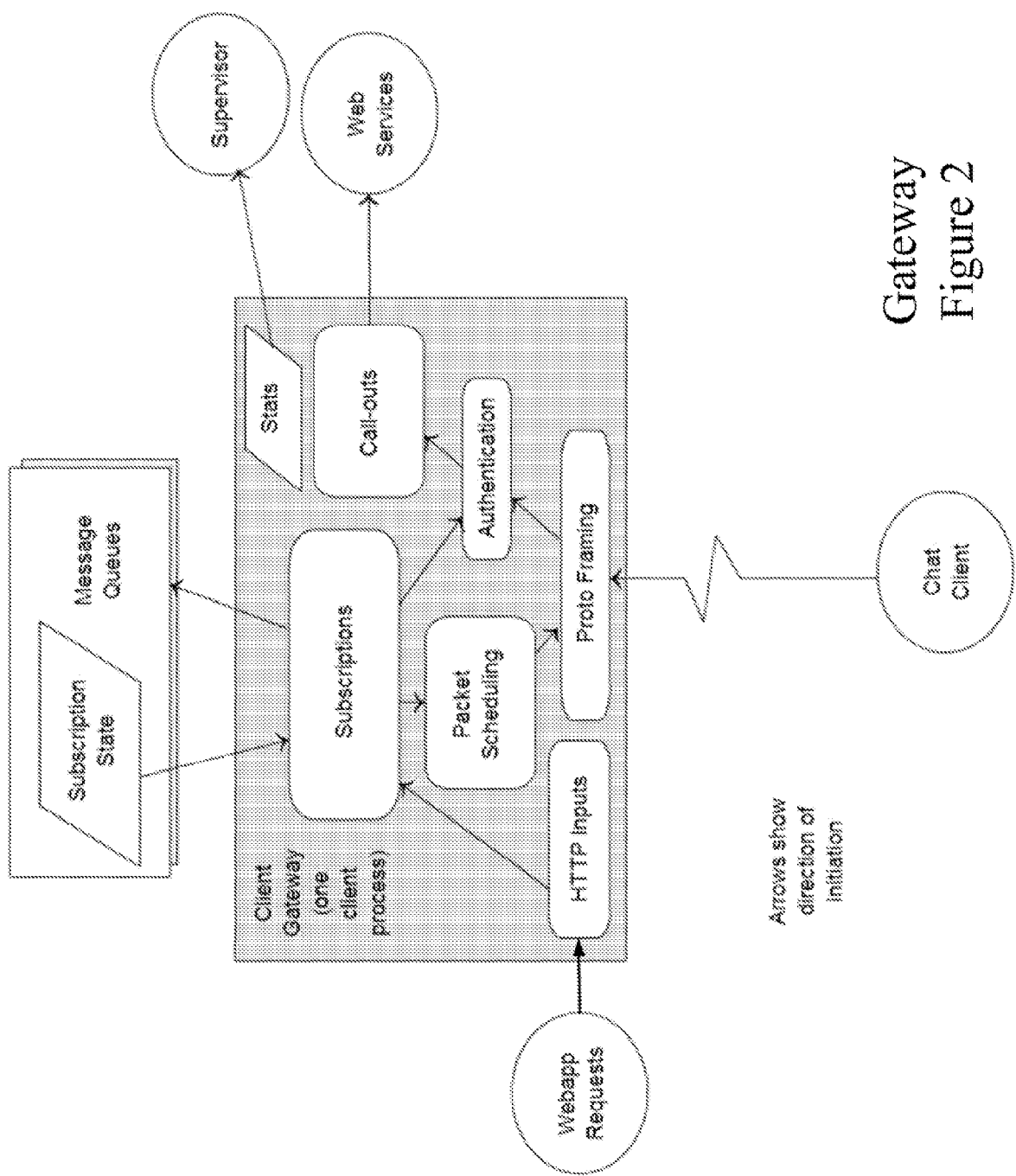
FIG. 2 illustrates the components of the Gateways 12 of an example embodiment.

Topologically, the Client Gateways 12 of various embodiments are the interface to the users at client systems 20. FIG. 2 illustrates the components of the Gateways 12 of an example embodiment. User requests come in to a server at a particular domain name. The received user requests are load balanced by load balancers 22 across gateways 12. There is no requirement that successive sessions for each user go to the same gateway, as there can only be one simultaneous session (Transmission Control Protocol—TCP connection) per user at a time. Sessions are typically long-lived. For example, one session can last for the entire time a user is logged into the client. In a particular embodiment, sessions can use a custom protocol, based on Google Protocol Buffers, over TCP.

Figure 3:
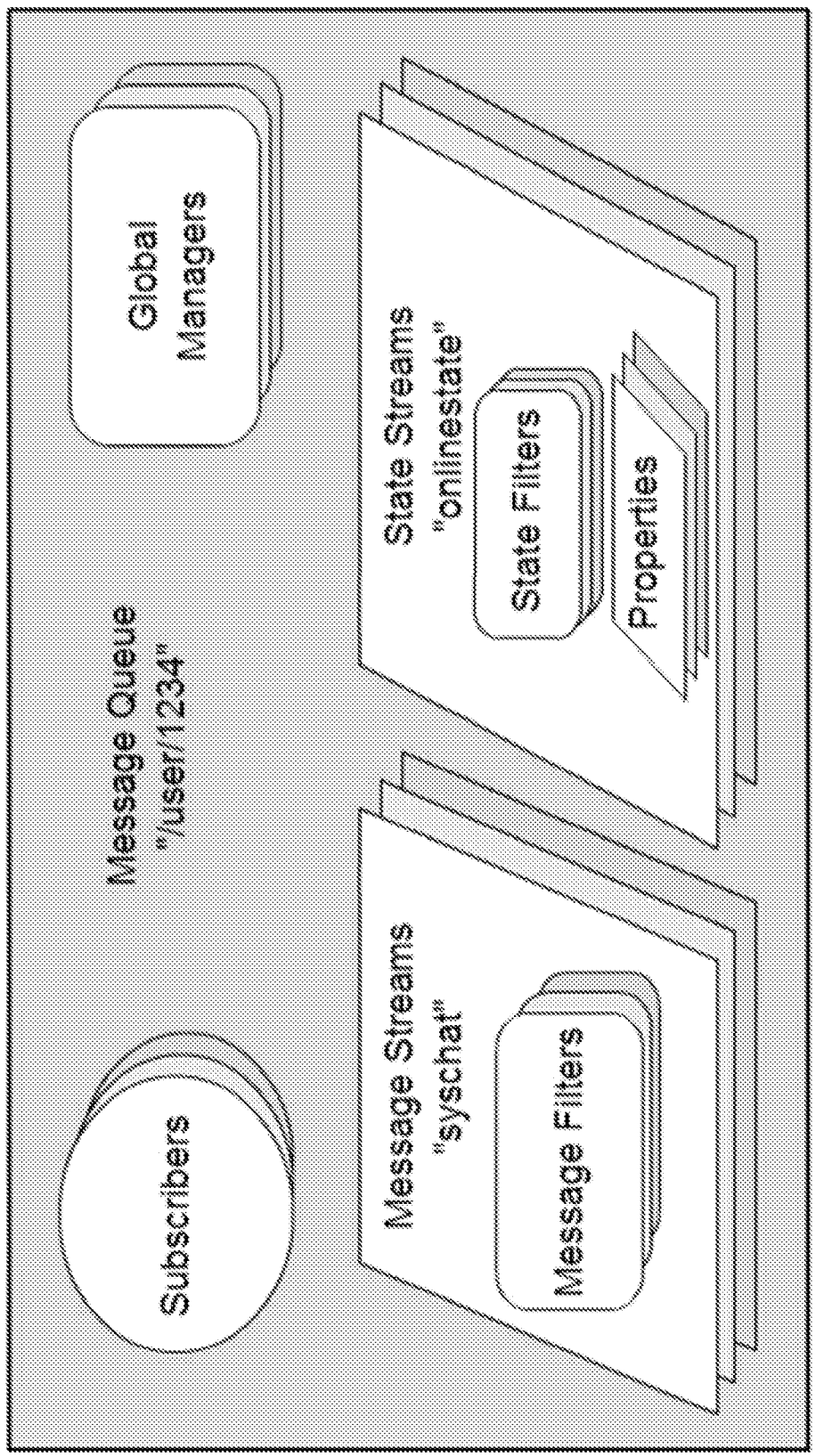
FIGS. 3 and 4 illustrate the components of the message queues of an example embodiment.
Figure 4:
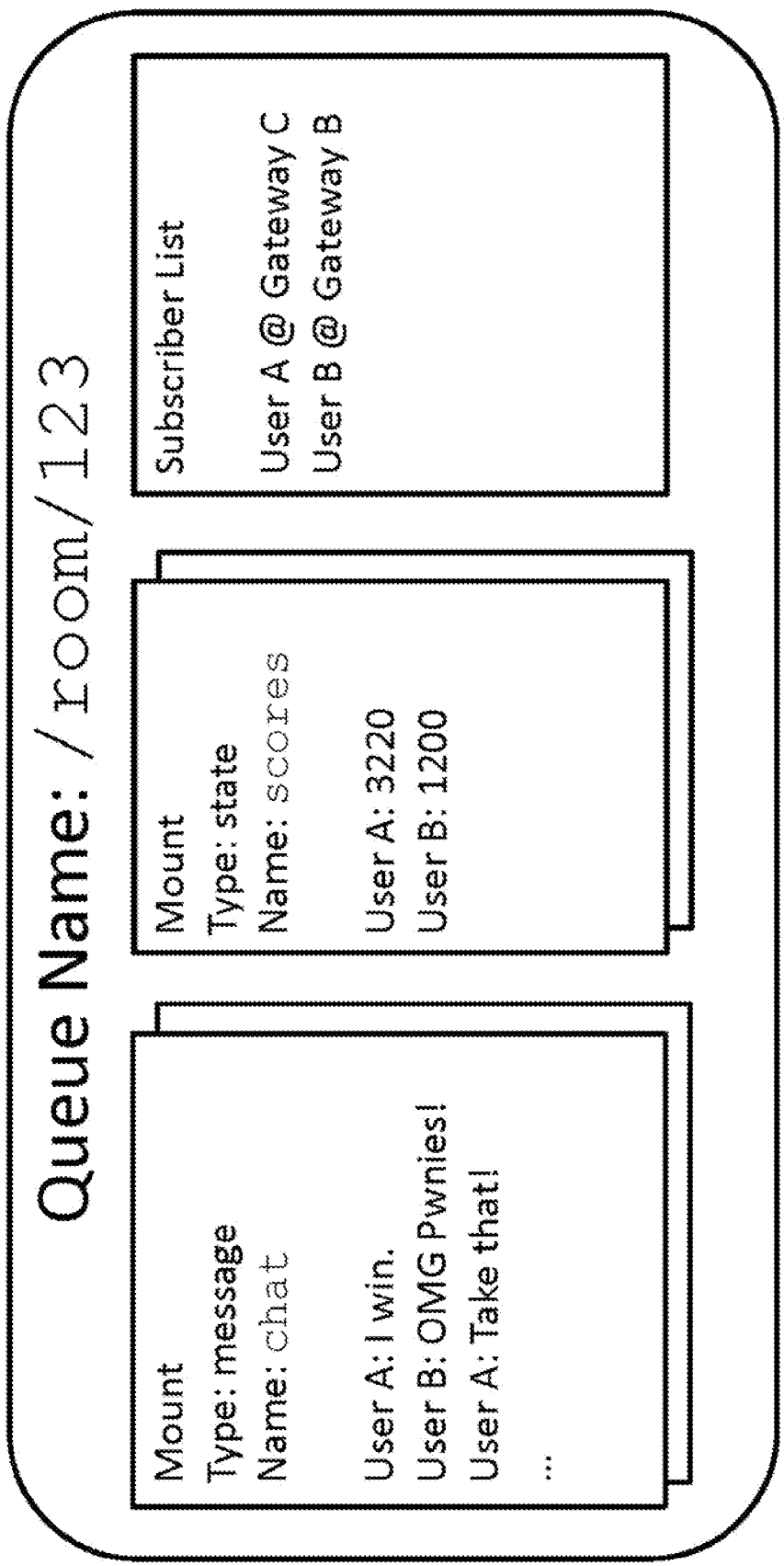
Figure 5:
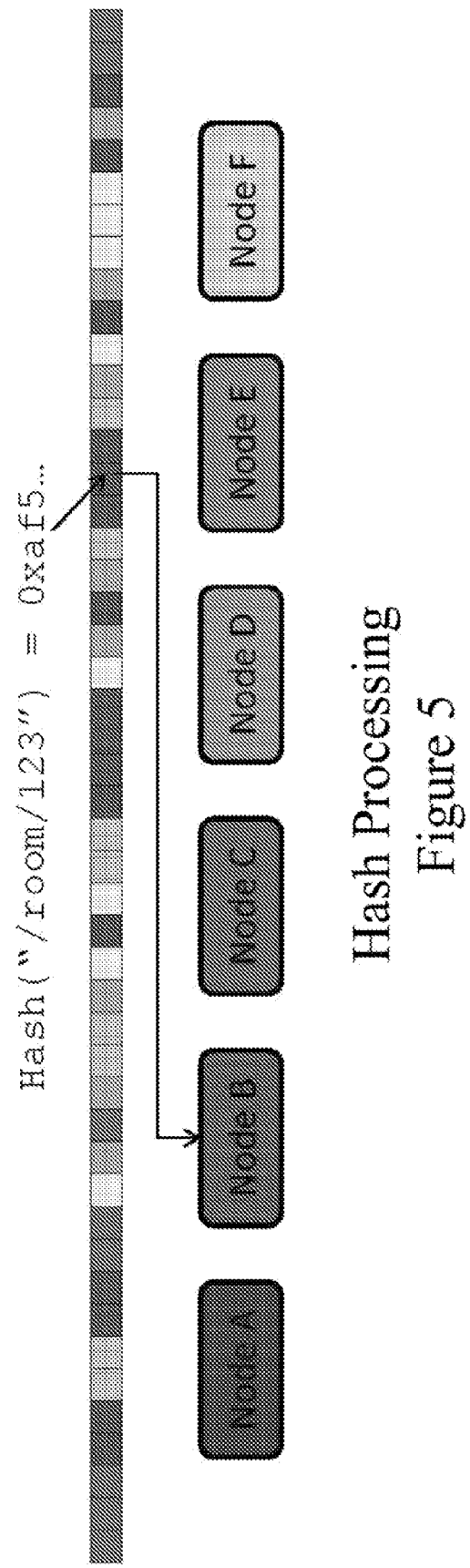
FIG. 5 illustrates the consistent hash processing of an example embodiment.

Gateways 12 can perform a muxing/demuxing function to vector user requests onto a pool of message queue nodes 14, where actual message queues are processed. Clients 20 can get subscribed to inspect (e.g., obtain access to) the messages coming across specific, named message queues. Additionally, clients 20 can get subscribed to send messages to specific, named message queues. FIGS. 3 and 4 illustrate the components of the message queues of an example embodiment. In a particular embodiment, each message queue node is responsible for a deterministic subset of message queues. The mapping of a queue name to a message queue node is performed by a queue map or node map, which maps a queue name onto "buckets" using a hashing process (e.g., hash(queue name)). FIG. 5 illustrates the consistent hash processing of an example embodiment. Each bucket is served by a given queue node. In a particular embodiment, a given queue node generally serves between eight and sixteen buckets with buckets being fairly distributed across nodes. It will be apparent to those of ordinary skill in the art that a particular embodiment can use a greater or lesser number of buckets per queue node.

A supervisor 16 is the authoritative source of the node map, as well as the central point where system-wide statistics are aggregated for easy monitoring. However, the supervisor 16 is not involved in any real-time message flow, and thus the entire system can serve in a fully operational state even if the supervisor node is temporarily down. However, the node map cannot be re-configured without participation by the supervisor.

In a particular embodiment, all machines run the same code source tree; but, the command line to start up each node determines what kind of node it is. Each node will register itself with the supervisor 16; thus, the supervisor 16 is a convenient place to determine which nodes are effectively part of the Message Queue system 10. In a particular embodiment, each "node" can be a typical 8-core, 8 GB RAM, compute-only (not database) server. In a particular system, one supervisor node ("boss") 16 is provided. If this supervisor node 16 goes down, instant replacement is not necessary; but, the ability to monitor the system will be degraded. In a particular embodiment, between five and ten client gateway nodes can be provided. A load balancer 22 can be provided to spread client requests across the available client gateway nodes. In a particular system, between five and ten message queue nodes can be provided. These message queue nodes or queue nodes can mostly message between themselves. In a typical system, internal traffic will be fairly low. In a typical embodiment, the entire queue will likely use less than a gigabit of bandwidth in aggregate at full load, until features and user counts swell beyond this point. A system-level metric for network packets and bandwidth in/out can also be provided.

The message queue nodes 14 can also do some messaging into web machines, mainly for authorization purposes. In a particular embodiment, this traffic uses Hypertext Transport) Protocol (HTTP) with JavaScript Object Notation (JSON). The message queue nodes can either use an existing web pool or create a new pool specifically for the Message Queue system as described herein. In general, a "pool" of servers is a set of servers that respond to a specific Domain Name Server (DNS) address, using front-end load balancing, in the terminology used herein. The server can get to the set of gateways to send messages to users, in a load-balanced way. In a particular embodiment, this traffic can use HTTP with JSON. In a particular embodiment, the software can be written on top of Erlang/OTP R13B04, which can be downloaded and built from source at http://www.erlang.org/

Each node has a Uniform Resource Locator (URL) that can output statistics in Nagios-compatible "key=value" text format. Thus, application-level monitoring scripts can be written by simply hitting that URL on each node. Node software can be set up to start in /etc/init.d, and can have the correct working directory and command line options specified.

The following sections describe a functionality level implementation of the Message Queue system processes of an example embodiment. The description includes an explanation of how the Message Queue system of an example embodiment is decomposed into software executables and processes. The Message Queue system of an example embodiment includes three kinds of processes: 1) a plurality of Gateway 12 processes, 2) a plurality of Queue Node 14 processes, and 3) a singular Supervisor 16 process. Additionally as shown in FIG. 1 for a particular embodiment, two more components can be provided: a plurality of Translator 17 processes and State Manager web services 18. These processes are described in more detail below. Initially, however, a summary of the terms used herein is provided.

GLOSSARY OF TERMS

Message Queue System
The entire system—consisting of client libraries, gateways, queue nodes and supervisor, as well as ancillary systems like translators and web services called by the core Message Queue System.

Message Queue (there can be on the order of 1,000,000 of these)
A single unit of subscription and access control in the Message Queue System, containing a list of subscribers (clients interested in listening on traffic through the queue) and a list of mounts. Message Queues are not typically disk persistent.

Message Stream (there can be on the order of 1,000,000 of these)
A single addressable endpoint in the Message Queue System, through which messages are broadcast to all subscribers of the queue. A message stream is identified as a named Mount within a message queue.

State Stream (there can be on the order of 1,000,000 of these)
A single addressable endpoint in the Message Queue System, through which state updates flow. A State Stream is typically not disk persistent, but supports eventual consistency of key/value state, as well as verification of state change requests through call-out to state managers. Addressed as a named mount within a Message Queue. May have zero or more state managers.

Mount
A specific named stream within a message queue—a Message Stream or a State Stream. As used herein, the term "mount" can be considered a synonym of the term "stream".

Client (there can be on the order of 1,000.000 of these)
A participant in the game/simulation. The client is not trusted to make any authoritative decisions about creation/deletion of shared state, unless it has special authorization.

Gateway (there can be on the order of 1,000,000 of these)
A process that accepts connections from clients, and routes them to appropriate endpoint message queue nodes. Additionally, the gateway performs authentication and Message Queue SystemT→Erlang serialization.

Queue Node (there can be on the order of 10 of these)
A machine hosting a process that routes messages and state updates through named message queues to subscribed clients (via gateways).

Gateway Node (there can be on the order of 10 of these)
A machine hosting Gateway and Persist processes.

Supervisor (there is 1 of these)
A machine and process that owns authoritative state about the configuration of the message queue infrastructure.
Persist (there can be on the order of 1,000,000 of these)
A process that acts as a "new" client from the point of view of a Gateway, but acts as a REST-style (Representational State Transfer-style) server from the point of view of a Translator. Associated with a specific client identifier (Cid) for a specific logged-in client. May in fact be a Gateway with specific Filter plug-ins.
Translator (there can be on the order of 1,000,000 of these)
A process that acts as a HTTP server on one end (for perlbal to talk to) and serializes to Erlang on the other. The Translator dispatches to the appropriate Persist for the incoming request based on Cid. Used by old clients to talk to the new system.
Translator node (there can be on the order of 10 of these)
A machine hosting Translator processes.
State Manager
A Plug-in that can check and evolve state update requests at the behest of queue nodes. Receives "old state" and "requested changes" as input, and outputs "new state."
Call-out
A process which responds to specific requests from Message Queue System according to a well-defined protocol, typically HTTP JSON services. One form of State Manager uses a Call-out. Gateway uses Call-out for authentication verification and connection drop notification.
Services (there can be on the order of 100 of these)
Processes that, through means outside this system, have authority to request creation, re-configuration and deletion of message queues.
State Plug-in
An Erlang module used by a State Stream mount to enforce state update consistency. One example is the PHP call-out plug-in.
Filter Plug-in
An Erlang module used by Gateways to filter messages going to and from clients. Can be used to translate messages using different formats into a uniform format for use by the rest of the message system or surrounding integrated system.

Gateway Processes

Figure 6:
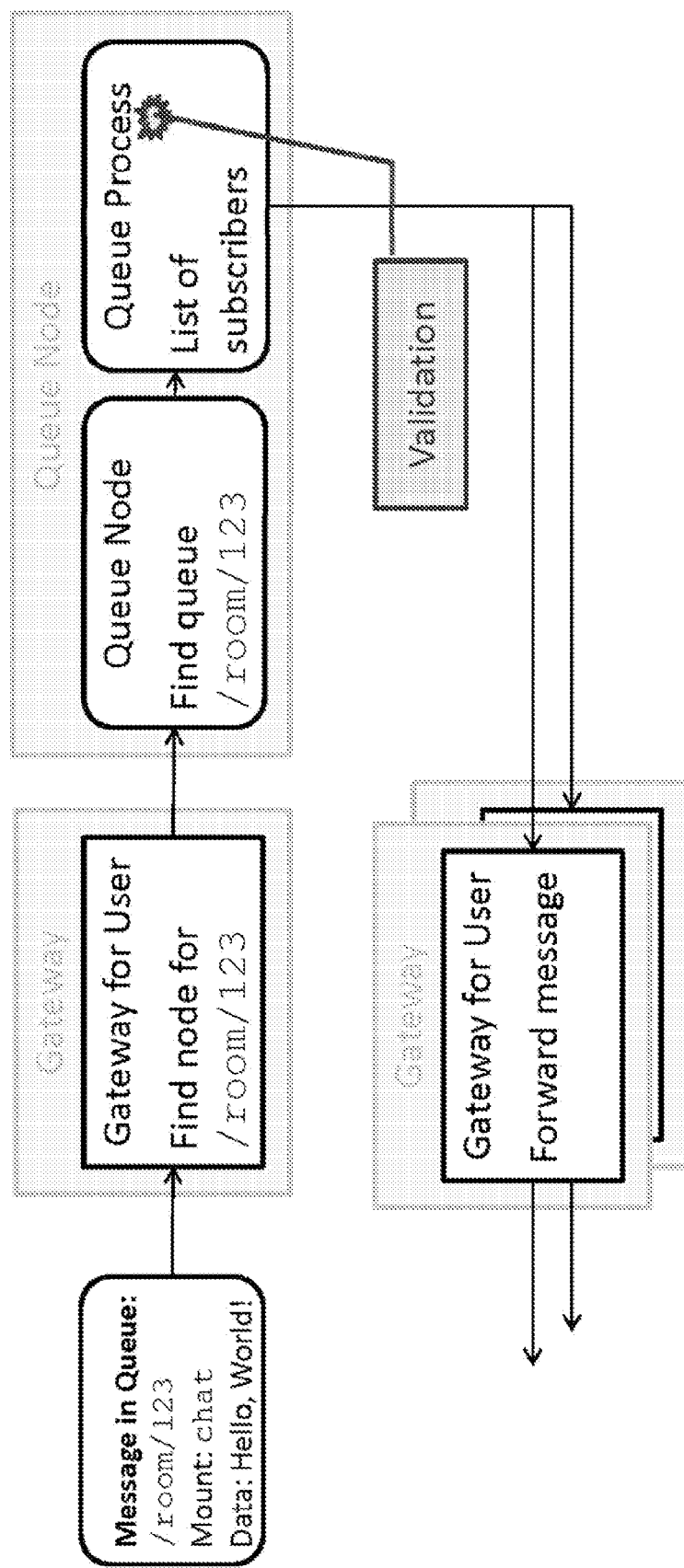
FIG. 6 illustrates the message processing in an example embodiment.

The gateway 12 processes maintain persistent connections with clients as well as with persistent server processes. Creating the connection establishes authentication, which persists for the duration of the connection. Other than authentication and binary protocol decode, the gateway process is relatively simple. The gateway process can map a queue name (id) to a target queue node and forward messages to the target queue node, as well as return responses to the appropriate connected clients. FIG. 2 illustrates the components of the gateways 12 of an example embodiment. FIG. 6 illustrates the message processing in an example embodiment. The gateway process can also create subscriptions between endpoints (e.g., queues and clients). Gateway processes establish a routing fabric for the queue id namespace. For each subset of the namespace mapping to a queue node, the gateway establishes one or more TCP connections, over which the gateway routes all messages to queues on that node, and receives messages from all queues on that node, which have currently subscribed clients on the gateway. When a subscription to a queue is requested for a client, the gateway adds the queue to a map of queues to which the gateway currently listens, if the queue is not already in the map. Additionally, the gateway adds a reference to the client from within that queue entry. That way, the gateway can route messages received from queues on connected nodes to the appropriate set of subscribed clients. This mapping is undone when a client un-subscribes from a queue, or disconnects. When a client sends a message or state change request to a queue, the gateway forwards the message to the appropriate queue. For any message that the gateway forwards, the authenticated user that made the request is added onto the request. Thus, a client would not (must not) include its own identity in any request; instead, the requester will be authoritatively identified in the message by the gateway process. That way, the system is immune against impersonation attacks. The gateway also has a management interface that allows bulk subscription, creation, deletion, and updates from trusted services on the web site. The gateway process may need a hook for sign-off, where the gateway process can call out to a web service to notify outside systems of the loss of a connected user. Alternatively, the system could subscribe to a queue specifically for the given user, and receive user-left notification when the user disconnects. Gateways can register themselves as available when the process comes alive. Gateways can send statistics to the supervisor once per time period (e.g., some number of minutes).

Queue Node Processes

In a particular embodiment, queue nodes 14 operate message queues. FIGS. 3 and 4 illustrate the components of the message queues of an example embodiment. Each message queue has a list or set of currently subscribed listeners. These lists may be different for each message queue. Each message queue consists of a name and a set of subscribers. Within the queue, message streams and state streams can be "mounted." Additionally, queues may have a configured state manager call-out service, as well as each "mount" within a queue. Queue nodes are largely passive, where gateways create connections to the nodes, and the nodes just react to incoming messages by routing and notifying interested gateways. When a queue node receives a user queue subscription request, the requesting gateway is added to a list of outputs for the queue, if not already present, and the subscribing user is added as an entry in that gateway entry. This way, a message only needs to be forwarded once to a gateway, even if multiple users on that gateway are subscribing to the same queue. When a user un-subscribes, or a gateway disconnects (e.g., because of failure), this procedure is reversed. For queue migration, described in more detail below, the state of a queue must be fully serializable and transferable to another queue node. Additionally, a queue node must be able to forward messages intended for a queue that has been transferred to the new queue node for the queue. Queue nodes can register themselves as available when the process comes alive. Queue nodes can send statistics to the supervisor once per time period (e.g., some value of minute).

Supervisor Process

The supervisor 16 process can manage all nodes in the Message Queue system. The supervisor process also manages the queue name to message queue node mapping table. In a particular embodiment, this mapping is maintained as a traditional "circle hash" (or, alternatively, as buckets mapped to nodes, allowing a 1-to-N re-mapping of a new node added to a set of N existing nodes. Additionally, the supervisor process collects statistics from the gateway nodes and queue nodes on performance and load of the system, and provides an aggregate view of system performance through a management interface. The supervisor process is typically not visible from outside the cluster network, but instead is fully accessed through web management services. The Supervisor can tell gateways about updates to the node mapping table.

In a particular embodiment, there is only one supervisor process. However, the supervisor process is not a single point of failure, in that the configured network of gateways and queue nodes can continue operating even if the supervisor process is temporarily inactive. In this case, the Message Queue system just won't be able to report statistics or re-configure the node mapping table. The supervisor process can, in a particular embodiment, simply serve as collector of statistics. The main functionality lost from this simplification would be the ability to add capacity or redistribute load from downed nodes without interruption of existing client connections.

Translator Processes

Older clients, not updated to communicate with the Message Queue gateways directly, or unable to do so because they are behind restrictive HTTP-only proxy firewalls, can continue to make XMLRPC calls to existing chat scripts. XMLRPC is a conventional remote procedure call (RPC) protocol, which uses Extensible Mark-up Language (XML) to encode its calls and HTTP as a transport mechanism. Those scripts may need to translate and forward messages to the Message Queue gateways. Because the Message Queue gateways use a persistent connection model, and the XMLRPC web servers typically use a Representational State Transfer (REST)-like polling model, something needs to translate between the two models.

The translator 17 process of a particular embodiment is a persistent, stateful process. The translator process establishes connections to the message queue gateways, one per client using the XMLRPC Application Programming Interface (API). The translator process then receives JSON requests from XMLRPC and translates them to Message Queue system messages. Additionally, the translator process buffers messages and state updates from Message Queue system queues and makes them available as JSON data to poll at the convenience of the XMLRPC system. If no messages have been polled for a pre-determined time (e.g., five minutes), the client is assumed to have disconnected, and the persistent connection is torn down.

A slight implementation variation would be to use XML instead of JSON for the translator inputs, making the work for the existing scripts easier. A more substantial implementation variation would be to entirely emulate the behavior of chat scripts to significantly reduce or eliminate the need for chat web servers. Mapping from an XMLRPC (chatweb) server to a translator process can be done using a simple mod operation on the customer id (cid). Alternatively, the mapping can be done statically based on the chatweb instance or using any other consistent mapping function, such as a circle hash or other consistent hashing mechanism.

State Manager Services

A queue state stream that receives a request to introduce, update, or delete a specific state (property value) can call aside to a state manager service 18 to enforce rules for state updates. The queue state stream can bundle up current state into a JSON formatted data block, as well as the requested state change, and post a request to a state manager web service. The state manager web service 18 then returns one of three results: a) ok: apply change as requested, b) denied: make no change, or c) altered: apply changes as returned by the state manager. State managers can run a stateless web service on a main web server. If load from state managers needs to be managed separately, this can easily be shifted to a separate pool of web front-ends as needed. The state manager in effect for a queue state stream is configured as a parameter when the queue is created. There can be any number of state managers in effect for a given queue. A given room, object, or service may use multiple queue state streams to implement different sets of state as needed. A state manager can listen to multiple mounted streams to make determinations based on multiple sets of state. For example, a rule that requires information about per-room avatar state (who is "king") and information about per-room state (which node is "the throne") can be mounted to see both kinds of information to be able to enforce the rule that only kings can sit on thrones.

Gateway Nodes

Gateway nodes can immediately start serving client requests when they have connected to the supervisor and received the queue namespace map. All gateway nodes need is to have the hardware load balancer start pointing clients at them. In a particular embodiment, a design goal is for 20,000 users to connect to a single server (8 cores, 24 GB/s memory bus). For clients that drop and re-establish TCP connections (e.g., because of intermittent WiFi hotspots), it is likely that a new gateway will be chosen for the new connection. To mitigate this, subscription information for a client is kept in a state stream specific to the client and managed by the gateway. When the client re-connects to the gateway, the client will have re-delivered all the subscriptions of which the client is currently partaking. This queue will be automatically removed after some amount of time-out (e.g., 60 seconds). If no client subscribes to the queue within the time-out period, the queue "hard" disconnects to not keep system resources allocated needlessly. To provide immediate sign-off notification to buddies, a controlled (user-initiated) sign-off will result in a message through the gateway, and a state update in the buddy state channel, before the gateway is disconnected.

Internally, the Gateway of a particular embodiment is based on gen_server (specifically, a TCP subclass for binary, and a HTTP server subclass for HTTP interface). Each of the acceptors starts a new Erlang process for each incoming request. For long-running connections (binary protocol for clients), this process builds up routing state specific to the user. Messages within the system are sent as Erlang tuples, typically constructed as Erlang structs.

Additionally, there is one "node dispatcher" process or "mapped forwarder" process per gateway node. This process translates a message queue name to a corresponding queue node and forwards outgoing packets to the queue node and receives packets from the queue node to dispatch to subscribing connected users. In a particular embodiment, client connections come in typically through port 443. Each accepted connection spawns a client framing handler, which decodes the protocol buffer protocol and turns requests into Erlang tuples (structs). Most messages go on to the queue map, which translates destination queue name to a given physical queue node and dispatches to the communication process for that queue node. There is at least one such process per node in each gateway node and used by gateway processes on that node. In a particular embodiment, responses from queues to subscribers can bypass this "node dispatcher" process; these responses can go straight to each subscribing gateway process. If the message "node dispatcher" process turns out to be a bottleneck process, we can parallelize this process, and round-robin between N message queue node dispatcher processes when we configure connection handling processes. The point of making this a separate process is that it makes dynamic re-mapping of the namespace much easier to implement.

The supervisor management interface is initially limited to pushing statistics to the supervisor. In a particular embodiment, these statistics can include:

messages routed per second <-- so we can track workloads

\# clients connected <-- so we can verify load balancing and detect outages
\# connected queue nodes <-- so we can find out if there are connectivity problems
\# queues subscribed per client <-- for statistical and planning purposes
minimum, average and maximum latency for turn-around requests (requests with op_id codes) <-- to track performance against a particular target (e.g., a 100 ms target)
the slowest message round-trips from the last time period (e.g., hour) <-- to track troublesome requests
\# web requests per second <-- to track cluster load on the Message Queue system
minimum, average and maximum latency for web requests <-- to track performance through the system
the longest-running web requests from the last time period (e.g., hour) <-- to track troublesome requests
total Erlang process memory sizes
largest Erlang processes, size and type
Erlang exception counts per process kind
software versions As part of the implementation of online queue node insertion/movement/removal as described in more detail below, the management interface can also partake in the queue map update commit cycle. The HTTP interface accepts JSON requests and returns JSON data. The HTTP interface spawns one Erlang process per HTTP connection. In an alternative embodiment, we can choose to move to a pool of request handlers. The interface translates JSON to Erlang structs, and back again from response structs to JSON. We extend JSON to support \xXX for hexadecimal, and use that encoding for characters less than 32 or greater than 126. An alternative is to send the characters as-is (expected by Unicode-style JSON) or as \uXXXX (expected by ASCII JSON)

Queue Nodes

Message queue nodes cannot start serving queue requests until they have been assigned a namespace area from the queue node map, which is managed by the supervisor. In a particular embodiment, each queue is represented by a single Erlang process. This means that all mounted name spaces in the queue (e.g., message streams and state streams denoted "property bags") are serialized within the queue. Call-outs to web services are serialized as well for streams that require call-out; messages posted on message streams may not need call-outs and thus will re-order compared to state change requests needing external verification. Queues can also include in-process filters or state managers, loaded as plug-ins into the Erlang process, and run as part of the queue process itself (again, for serialization purposes).

In a particular embodiment, the design goal is for up to 100,000 queues to live on a single server (8 GB, 8 cores, 24 GB/s memory bus). This allows up to 80 kB of state per queue. If memory restrictions become a problem because of per-queue overhead, we can split onto more queue nodes, rather than increase RAM in a single box, so as to keep system-wide latency low. In a particular embodiment, the design goal is for a single message to flow through the system (from incoming gateway via queue nodes out to listening clients) within 100 milliseconds. Note that a server with 24 GB/s memory bus and 8 GB of RAM would have to spend 350 milliseconds to work through an 8 GB working set.

Mapping of a named queue to a queue node is done through an MD5 hash of the queue name, followed by a map of the top N bits (e.g., 10 bits) of the MD5 hash to a sequence of buckets allocated to node servers. MD5 hashing is well known to those of ordinary skill in the art. Initially, many buckets will be allocated to each participating queue node. As more queue nodes come online, buckets will be fairly removed from allocated nodes and added to the new node to retain stochastically balanced 1/N load mapping. The supervisor holds the master map of hash-to-node mappings. In a particular embodiment, we can enforce a minimum number of buckets per node, to even the load. For example, if we allowed one node to be mapped by two buckets, and one node to be mapped by three buckets, the difference in load assuming otherwise homogenous load distribution would be 50% more on the second node than on the first node. In a particular embodiment, a policy of a minimum number of buckets per node can be enforced (e.g., eight buckets minimum per node). Once all nodes have eight buckets, for example, we can double the number of buckets per node without changing the mapped address space. In this manner, each bucket turns into two new buckets for a total of 16 buckets per node. Then, We can start fairly redistributing again without fear of load imbalance. The minimum number of buckets used per node determines the maximum load imbalance assuming otherwise homogenous loading (no "hot keys"). For a minimum of eight buckets per node, the worst-case ratio is 8:9, or 12.5% more load on the second host. There is a cost in increasing the minimum number of buckets; because, the node map is "hot data" for the queue node mapper processes. Thus, the node map should ideally fit well into an L1 cache.

Internally, each message queue is an Erlang process. Additionally, there is a receiving process for incoming messages from each gateway.

The message queue nodes receive requests from gateways. These requests go to the "central input" process for the physical node, which in turn dispatches to the appropriate message queue process. Message queues are Erlang processes—one per message queue. Within each message queue, different named "handlers" are "mounted." These implement specific behaviors, such as message forwarding or state storage. Handlers take the form of Erlang modules, referenced by name. The state storage handler additionally supports plug-in state managers, again written as Erlang modules. It will be apparent to those of ordinary skill in the art that modules of a type other than Erlang modules can be similarly used. One state manager handler plug-in is the PHP call-out handler. This means that plug-ins must be allowed configuration data, such as what URL to call out to, in this case. Each queue contains the list of subscribed users, sorted as a list of subscribed gateway nodes, with a list of users per gateway entry, allowing reference counting for the output nodes, as well as generating presence information.

Figure 7:
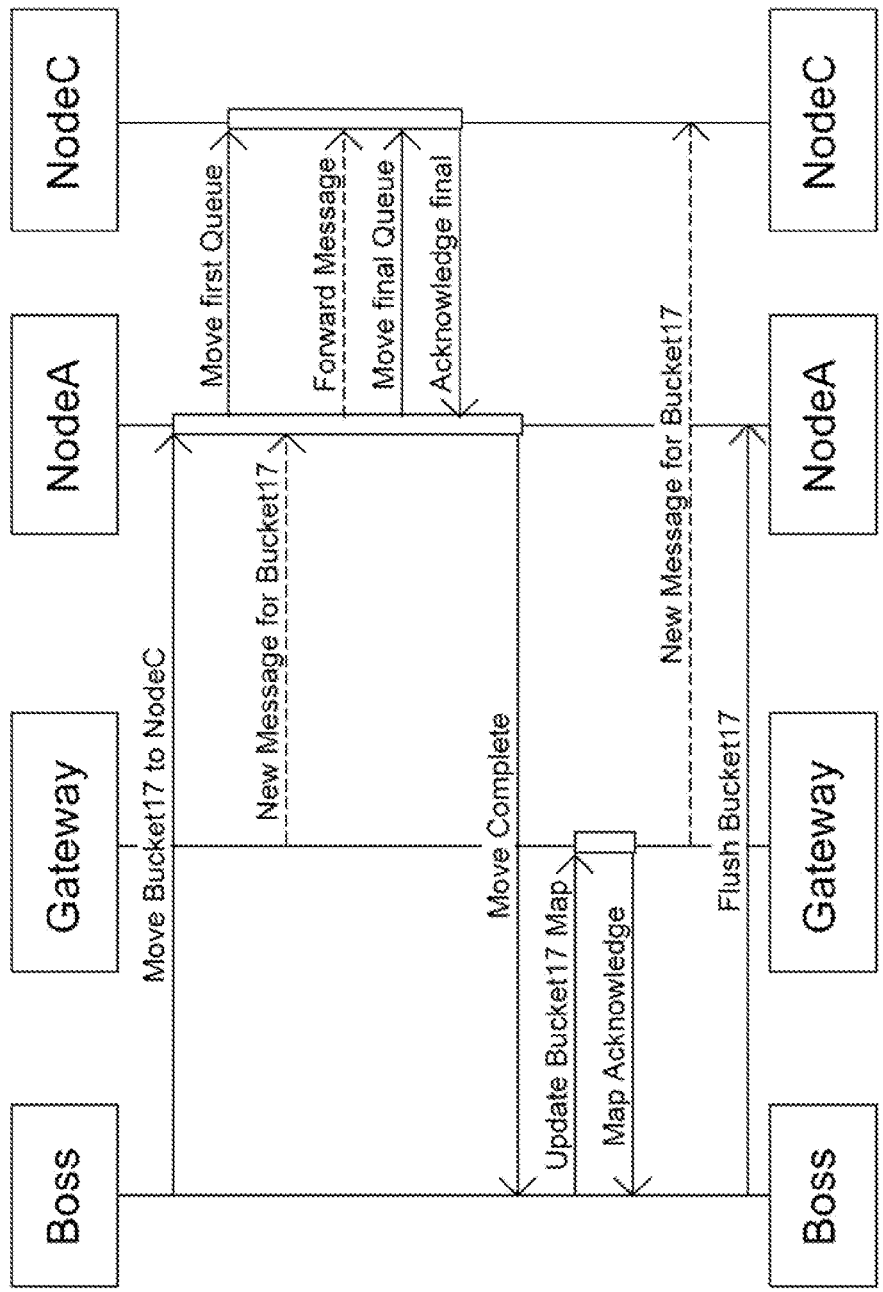
FIG. 7 illustrates the hot add node processing of an example embodiment.

We design for hot code re-load in most cases. This is illustrated as the "loop" function calling itself tail-recursively explicitly through the module name. Certain data structure updates will require rolling restarts instead. Tests can be used to find most of these cases, and we can detect them through exception counters similar to the web push monitor on staged deployment. The supervisor currently is the recipient of runtime metrics. In a particular embodiment, these metrics can include:

\# routed messages per time period
\# message queues
\# mounts per message queue
average state storage memory per queue
total memory used by queue processes
largest processes, sizes and types
Erlang exceptions, counts and process types
software versions The supervisor 16 can also make the node receiver process partake in queue migration. Queue migration means that the node will direct Message queues to serialize and move to a new host node, after which messages intended for the moved message queues will be forwarded to the target node. This will continue until all gateways have committed the new message dispatch map, at which time any knowledge about the migrated-out queues can be purged. This process can be denoted a hot add node processing. FIG. 7 illustrates the hot add node processing of an example embodiment. Queue migration can be requested one queue at a time, which would allow the node to keep serving other requests in the meanwhile, and queue only messages intended for the queue that is moving. When the moved queue reports success, pended messages are forwarded and the next queue to move is started. If we have 100,000 queues, and migrate one queue per millisecond, and migrate 1/10th of all queues, this process would take 10 seconds, so being able to serve requests while migrating is important for system responsiveness.

The message queue is responsible for the re-sending of missed messages if a client disconnects and re-connects. To support this, the message queue can number each outgoing message generated by mounts. When a client connects, the client can provide a serial number for the "last received message." If this serial number matches a message that's still remembered by the queue (or the serial number prior to the oldest remembered message), then messages after that will be re-delivered, and the client will be assumed to be up to date. If the serial number is 0, or if the serial number falls before the remembered range of messages, then the connection will be treated as "new" and each mount will be called upon to deliver "new state," which for message streams does nothing, and for state streams delivers a snapshot of all the state.

Supervisor Node

The supervisor will be addressed using a system-wide registered name (e.g., "supervisor") in the Erlang runtime. The supervisor is started as supervisor using special command-line arguments. Message queue nodes and gateway nodes that come online will register themselves with the supervisor, using the type described by command-line parameters to the node's executing process. The supervisor will aggregate statistics from the different nodes, and provide a comprehensive management overview of metrics within the system. When inserting a new message queue node into the system, the supervisor will first tell all queue nodes about the new map, and have them forward queue state (as well as incoming traffic for the target queues) to the new node. Then, the supervisor will distribute the new map to all gateways, so that gateways will know to send incoming traffic to the appropriate new node. Finally, all nodes will be told that the new node has "committed," and the old nodes can remove any state related to the now moved message queues.

Client

The client is updated to connect to the Message Queue system (e.g., by a Domain Name Server—DNS name) for chat message based communications. XMLRPC calls, such as checkForMessages( ) are re-vectored to be driven by traffic from the Message Queue gateway. There needs to be only a single connection between the gateway and the client. A user is identified to the gateway through a hash-signed cookie, containing an expiry time, a user id and a hash signature. This cookie is issued by the web system when the client first logs in (until and unless login happens entirely through the gateway). To avoid cookie theft, there is a three-way handshake, where the gateway issues a cryptographically random challenge to the client, and the client signs this with the user's password and returns to the gateway. The gateway then verifies that the signature correlates with the signature obtained through signing the challenge locally. This requires the user's password to be held server-side. To counter this, in one embodiment, the user signs the challenge with a hash of the password, and a password is stored server-side, which means that the hash of the password is the new "password," but avoids plaintext password leakage should we have a system intrusion event.

Security

The system of various embodiments is designed to avoid user impersonation attacks. The system is also designed to mitigate identity theft attacks, and to reduce the cost of authentication checking to the set-up handshake phase. As long as services use the established identity (e.g., customer id) for any source-dependent operations, the system will be secure. Mal-formed services that pass plaintext ids to services cannot be guarded against at this level; but instead have to be mitigated by proper API design and separate service auditing.

Client/Server Integration in an Example Embodiment

All creation, subscription, and un-subscription to queues happen on the server side, as a side effect of some XMLRPC or other API call. For instance, as part of user login processing, a login process can create a user's system chat and buddy-state queues and subscribe the user to these chat and state queues. When subscribing to a queue, three flags can be specified:

Whether you should create the queue if it doesn't already exist (i.e. true when subscribing to your buddystate, false when subscribing to your friend's buddystate)

Whether you are interested in knowing of the other subscribers for the queue

Whether you are a "keep-alive" participant; whether your presence should control the queue's existence (again, true for your buddystate, false for a friend's)

Successful subscription generates a "queue subscribed" message on the network to the client, which is how a client session learns of a queue subscription that happened out in an XMLRPC call. If no direct TCP connection has been established for that client, the gateway remembers the queue subscription so that when the client does connect, all subscription messages can be then sent down. This handles the case of queue subscriptions that occur during user login, which happens before the client has connected to a gateway via TCP. Similarly, un-subscriptions will send a "queue unsubscribed" message to the client.

Client Processing in an Example Embodiment

Initially, a service is registered at the client to handle the client-side processing associated with the Message Queue system described herein. In a particular embodiment, a ServiceProvider module on the client can register a new service, MQManager, for handling the client-side processing associated with the Message Queue system. After client login, the MQManager service can have the necessary data to start an authentication and connection process on the client. See below for more detail on the login process in a particular embodiment.

Objects interested in queues can register as a listener for that queue, by name, with MQManager, and provide a message handler callback. Only one object is responsible for authoritative handling and consumption of a given queue, so only one object is allowed to listen. If MQManager already has a listener waiting for queue named X and another listener attempts to register to listen, the MQManager will raise an exception. If more objects need to know of messages for that queue, the listening object's message handler can communicate events to other listeners.

MQManager can store callbacks for each queue name and call those callbacks as the MQManager receives messages. The MQManager decodes the messages first, so the listener's message handler receives a message object and not a bit string. The queue subscribed message itself will be sent along to the listener's message handler, as the message may contain initial state or initial participant data. Also, the listening object may be interested in the point of subscription. Similarly, unsubscribe messages can be sent to the message handler. Note that when an unsubscribe message is received, we do not immediately remove the listener from the list. Instead, we want the listener to automatically detect if another subscribe request for the same queue happens, without the listening object having to subscribe again. When MQManager receives a message and calls the listener's callback with the decoded message object, MQManager can also pass the queue name, for objects using one callback to listen to multiple queues. MQManager can filter out messages that are marked as originating from this user, so chat sessions don't have to deal with echo messages.

If a subscription message received by MQManager doesn't have an object listening to that queue, MQManager backlogs the subscription message by queue name. Subsequent messages that come in for that queue will be backlogged in the same spot. If an object attempts to listen to that queue name at some later point, the object can immediately have this backlogged batch of messages sent to the object. This allows objects to listen for subscriptions if they don't immediately know of the queue name. For example, a user creates a chat, but doesn't know that the new chat's queue name is "chat/49723942/messages" until a call returns with the newly-created chatId 49723942. When backlogging a message, if the oldest message in the backlog for that queue is older than a time period (e.g., 5 minutes), we can log an error, discard that queue's backlog, and stop backlogging subsequent messages for that queue.

The message sending component of the MQManager (e.g., sendMessage) can take an optional "expectAsyncResult" flag. Messages sent with this flag can have an op_id generated by MQManager to be appended to the message and returned by sendMessage. Messages sent with "expectAsyncResult" are state messages that expect a pass/fail response; a message sent with an op_id can asynchronously receive a response from the network specifying to which op_id the message relates, and a pass/fail result. What the calling object does with the op_id created by sendMessage, and the subsequent result message sent to its handler, is entirely the responsibility of the calling object. See the chat disclosure below for an example of usage.

MQManager can also handle the sending of a keep-alive ping over TCP every time period (e.g., 20 seconds), if there is no other outbound traffic. MQManager can also handle the receiving of a keep-alive ping every time period (e.g., 20 seconds) from the gateway if there is no other inbound traffic. If the expected keep-alive isn't present or the connection is otherwise unexpectedly lost, MQManager can reconnect transparently, queuing up messages to be sent during the non-connected state, including the message that may have been pending during a socket error. These queued up messages can be sent out once connection is reestablished. The gateway can maintain the subscriptions for the client automatically, if the reconnect happens quickly enough. If a connection cannot be reestablished within a reasonable time frame (as the gateway will consider this client's extended absence of connection a timeout and will kill existing subscriptions), the client should behave like it normally does for an extended network outage, requiring the user to sign in again. Connection lapse is the only thing that will cause an outgoing message to be queued up for later delivery; any failure in sendMessage in the gateway or beyond (e.g., sending to non-existent queue, sending to queue that one isn't subscribed to or can't write to) will silently fail, unless an op_id was specified (e.g., a "expectAsyncResult" was passed to MQManager.sendMessage). In this case, an error result will come back.

Login Processing in an Example Embodiment

Though the MQManager is created when it is registered with serviceProvider, MQManager does not begin to establish a TCP connection until after user login is finished. After connection occurs, the authentication process is initiated. In a particular embodiment, authentication is a multi-step process including the following steps:
Client sends a cookie, provided at login, to identify itself
Gateway responds with random challenge
Client signs challenge with hash of password and sends signed challenge
Gateway signs its challenge locally with the hash of the password and verifies this matches what the client just served, and indicates pass/fail to the client If authentication fails, the user is asked to log in again, in a manner similar to a login failure. As part of the login process, a login component creates and subscribes the user to a system-chat queue and a buddy-state queue. For both the system-chat queue and the buddy-state queue, the subscriptions are marked as not interested in other subscribers, and that the user is a keep-alive participant. Additionally, the login component loops over all of the user's friends, fans, recent chats, anyone who would appear in the user's friends mode, to subscribe the user to their queues and all of them to the user's queue. Because the subscriptions are marked as non-creating, nothing will happen for offline friends with no queues of their own or no way to subscribe to the user's queue. The subscriptions are also all marked as non-keep-alive.

System Chat Processing in an Example Embodiment

In a particular embodiment, there is a manager object, which listens for systemchat subscription messages. Upon receiving systemchat messages, the manager object echoes the systemchat message content on an event bus, for all clients to consume. The manager object does not echo the subscription and un-subscription messages. In one embodiment, system chat events come from the server as a string token with a JSON blob of arbitrary payload.

Friends Processing in an Example Embodiment

Shortly after login on the client, a BuddyState object is activated. The BuddyState object is the main buddy manager object that manages the user's buddies. The BuddyState object can immediately fetch a list of the user's friends (buddies) shortly after login. For each buddy in the list, the BuddyState object can listen to the buddyState queue for that friend (e.g., using one single callback for all of the buddies). A subscription message for a particular queue means that a user's friend is online, and an un-subscription message for that particular queue means that a user's friend is offline. Therefore, at BuddyState object initialization time, all friends are offline until proven otherwise. Other messages over those queues can notify the user of their actual buddy state (e.g., Do Not Disturb-DND, adults only, away, etc.). Updates to online status and actual buddy state can be delivered to the various parts of the client using the BuddyState object's event system. The BuddyState object is also responsible for handling the user's buddyState queue, and sending messages to the user's buddyState queue (e.g., I went DND, I went available, I am signing off, etc.). When a user signs off, a "signing off" message is sent on their buddyState queue, so the BuddyState object can interpret either a signoff message or an un-subscription for some friend as the user going offline. When a user vanishes without the signing off message, their gateway will eventually time them out and unsubscribe them from all of their queues. Because that user was the keep-alive participant for their own buddy queue, that buddy queue will be torn down and all other participants will be unsubscribed, which is how other clients will team of the user's timeout. Note that because listeners are kept around in MQManager even after an un-subscription occurs, the BuddyState object doesn't have to listen again when a friend goes offline and an un-subscription is received from the network. A user learns of new friends coming online; because, part of that friend's login processing is to subscribe to all of their friends' buddyState queue. For buddy list changes (e.g., adding friends, removing friends, etc.), the BuddyState object can listen to subscriptions for the new buddy, and subscribe or un-subscribe the users from each others' buddyState queues. Similarly, for new recent chats, the BuddyState object can listen to the subscription for the new recent chat, and can create the appropriate subscriptions between the recent chatting users.

Logout Processing in an Example Embodiment

A TCP connection that is cleanly disconnected will cause the gateway to unsubscribe the logged out user from all queues, which, depending on the user's keep-alive status for those queues, will tear down some queues entirely. In the event of an unclean shutdown, the user's gateway will time out the user and perform the same steps. Additionally, in case of a gateway crashing, the existence of a queue stops if there have been no "strong" subscribed users for a period of timeout.

Chat Creation Processing in an Example Embodiment

When a user initiates a chat session at a client, a client chat module or the MQManager can create a chat session identifier (chatId). The MQManager can then create and subscribe the user to a message queue (messageQueue) and a state queue (stateQueue) for the chat. The message queue is marked as interested in participants, and for both the message queue and the state queue, the user is not marked as a keep-alive user. Initial and ongoing participant information is communicated in either direction to the client's session objects through the messageQueue, as well as actual messages and other chat-stream messages, such as animations. Initial and ongoing seat state is communicated in either direction to the chat session through the stateQueue. Seat assignment, being a state queue message, can expect an asynchronous response. Therefore, the chat session, when sending seat messages, can set the "expectAsyncResponse" flag to true, store the op_id returned from sendMessage, and expect a result message to come to its message listener function at some point in the future that has the result for that op_id. For example, we can move the seat locally, send the message and record the seat move and op_id in the chat session somewhere (e.g., an object containing op_id: (cid, old_seat, new_seat). When a result message is received from the network for that given op_id, we can either hump our entry out of the object containing op_id (if the seat assignment passed) or undo the seat move locally (if the seat assignment failed). Note that chatIds may only exist as a means to name and uniquely identify queues for a particular chat. The existence of a queue for some chat is what really represents the existence of that chat.

Chat Join Processing in an Example Embodiment

When a user joins a chat session at a client, a client chat module or the MQManager can subscribe the user to the messageQueue and stateQueue for the chatId the user is attempting to join, marking the subscriptions as non-keep-alive and non-creating. In the event that the queues don't exist, we can increment an error counter. The client chat module or the MQManager can be responsible for unsubscribing the user from the messageQueue and stateQueue for the chatId.

Invite Processing in an Example Embodiment

In a particular embodiment, a chatgateway.attemptInvite XMLRPC call can be used to create an invite in the database and to send a systemChat notification to the invitee instructing their client to call chatGateway.checkForInvite, retrieve the invite and either accept or give a decline reason. The accept or decline reason can be returned to the invitor as the synchronous return value to their attemptInvite call. In an alternative embodiment, an invitor can send a systemchat invite to the invitee, whose reply is delivered back asynchronously as another systemChat message to the invitor.

Details of a Particular Example Embodiment

Figure 8:
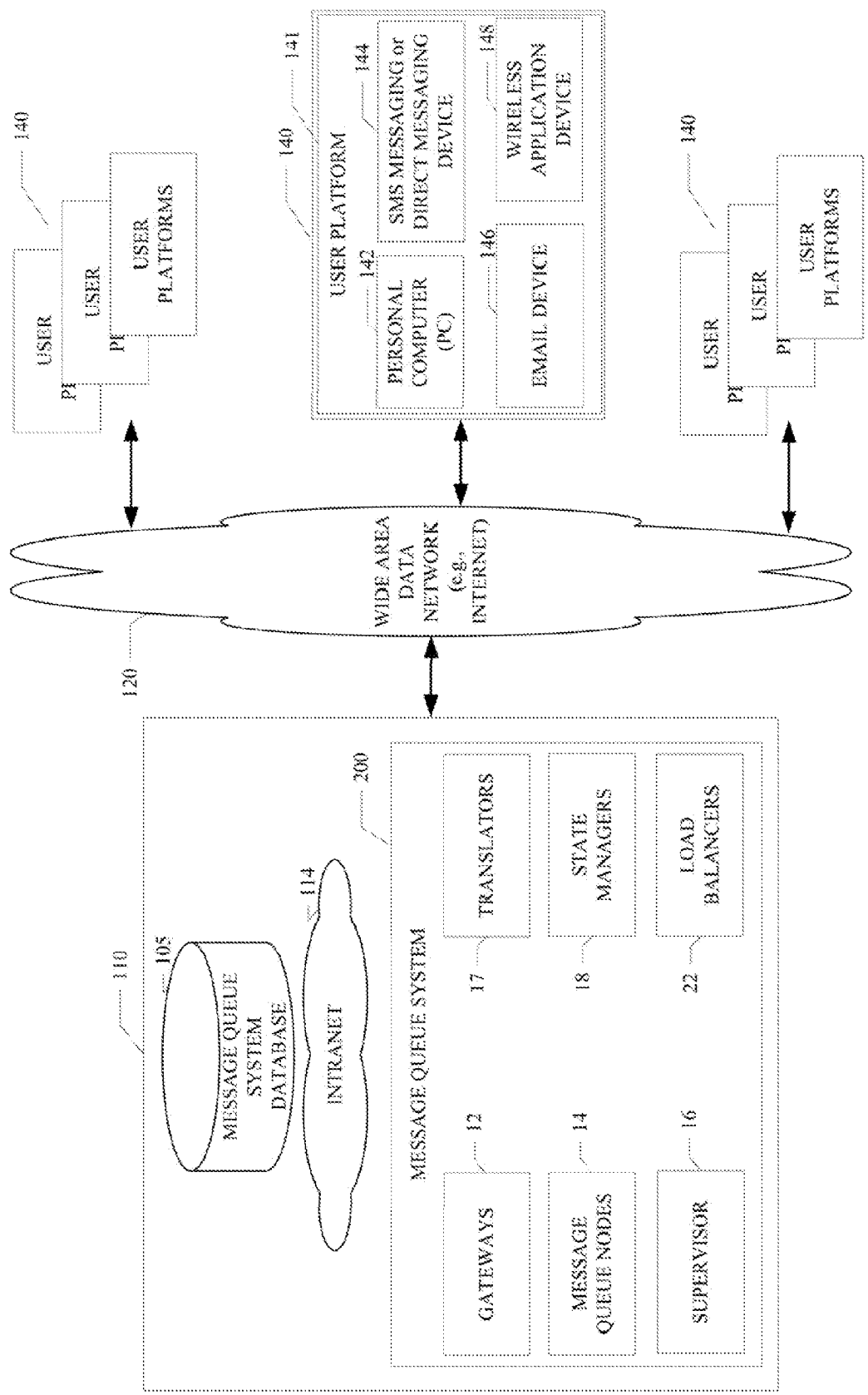
FIG. 8 illustrates an example embodiment of a system and method for managing multiple queues of non-persistent messages in a networked environment.

Referring to FIG. 8, in an example embodiment, a system and method for managing multiple queues of non-persistent messages in a networked environment are disclosed. In various example embodiments, an application or service, typically operating on a host site (e.g., a website) 110, is provided to simplify and facilitate non-persistent message and state transfers between a plurality of users at user platforms 140 from the host site 110. The host site 110 can thereby be considered a message queue system site 110 as described herein. Multiple user platforms 140 provide a plurality of message streams of which a user may become a content consumer and/or a content provider. The message queue system site 110 and the user platforms 140 may communicate and transfer messages, related content, and information via a wide area data network (e.g., the Internet) 120. Various components of the message queue system site 110 can also communicate internally via a conventional intranet or local area network (LAN) 114.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital User Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, LTE, UWB, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The user platforms 140 may include any of a variety of providers of network transportable digital content. Typically, the file format that is employed is XML, however, the various embodiments are not so limited, and other file formats may be used. For example, feed formats other than HTML/XML or formats other than open/standard feed formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein. Syndicated content includes, but is not limited to such content as news feeds, events listings, news stories, blog content, headlines, project updates, excerpts from discussion forums, business or government information, and the like. As used throughout this application, including the claims, the term "feed," sometimes called a channel, refers to any mechanism that enables content access from a user platform 140.

In a particular embodiment, a user platform 140 with one or more client devices 141 enables a user to access content from other user platforms 140 via the message queue system site 110 and network 120. Client devices 141 may include virtually any computing device that is configured to send and receive information over a network, such as network 120. Such client devices 141 may include portable devices 144 or 146 such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 141 may also include at least one client application that is configured to receive content or messages from another computing device via a network transmission. The client application may include a capability to provide and receive textual content, graphical content, video content, audio content, alerts, messages, notifications, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Client devices 141 may also include a wireless application device 148 on which a client application is configured to enable a user of the device to subscribe to at least one message source. Such subscription enables the user at user platform 140 to receive through the client device 141 at least a portion of the message content. Such content may include, but is not limited to, instant messages, Twitter tweets, posts, stock feeds, news articles, personal advertisements, shopping list prices, images, search results, blogs, sports, weather reports, or the like. Moreover, the content may be provided to client devices 141 using any of a variety of delivery mechanisms, including IM, SMS, Twitter, Facebook, MMS, IRC, EMS, audio messages, HTML, email, or another messaging application. In a particular embodiment, the application executable code used for content subscription as described herein can itself be downloaded to the wireless application device 148 via network 120.

In some cases, a user at user platform 140 can subscribe to certain content and/or content channels provided by all mechanisms available on the client device(s) 141. In various embodiments described herein, the host site 110 can employ processed information to deliver content channel information to the user using a variety of delivery mechanisms. For example, content channel information can be delivered to a user via email, Short Message Service (SMS), wireless applications, and direct messaging (e.g., Twitter) to name a few. Additionally, content channel information can be provided to a user in response to a request from the user.

Referring still to FIG. 8, host site 110 of an example embodiment is shown to include a message queue system 200, intranet 114, and message queue system database 105. Message queue system 200 can also include gateways 12, message queue nodes 14, a supervisor 16, translators 17, state managers 18, and load balancers 22. Each of these modules can be implemented as software components executing within an executable environment of message queue system 200 operating on host site 110. Each of these modules of an example embodiment is described in more detail above in connection with the figures provided herein.

Figure 9:
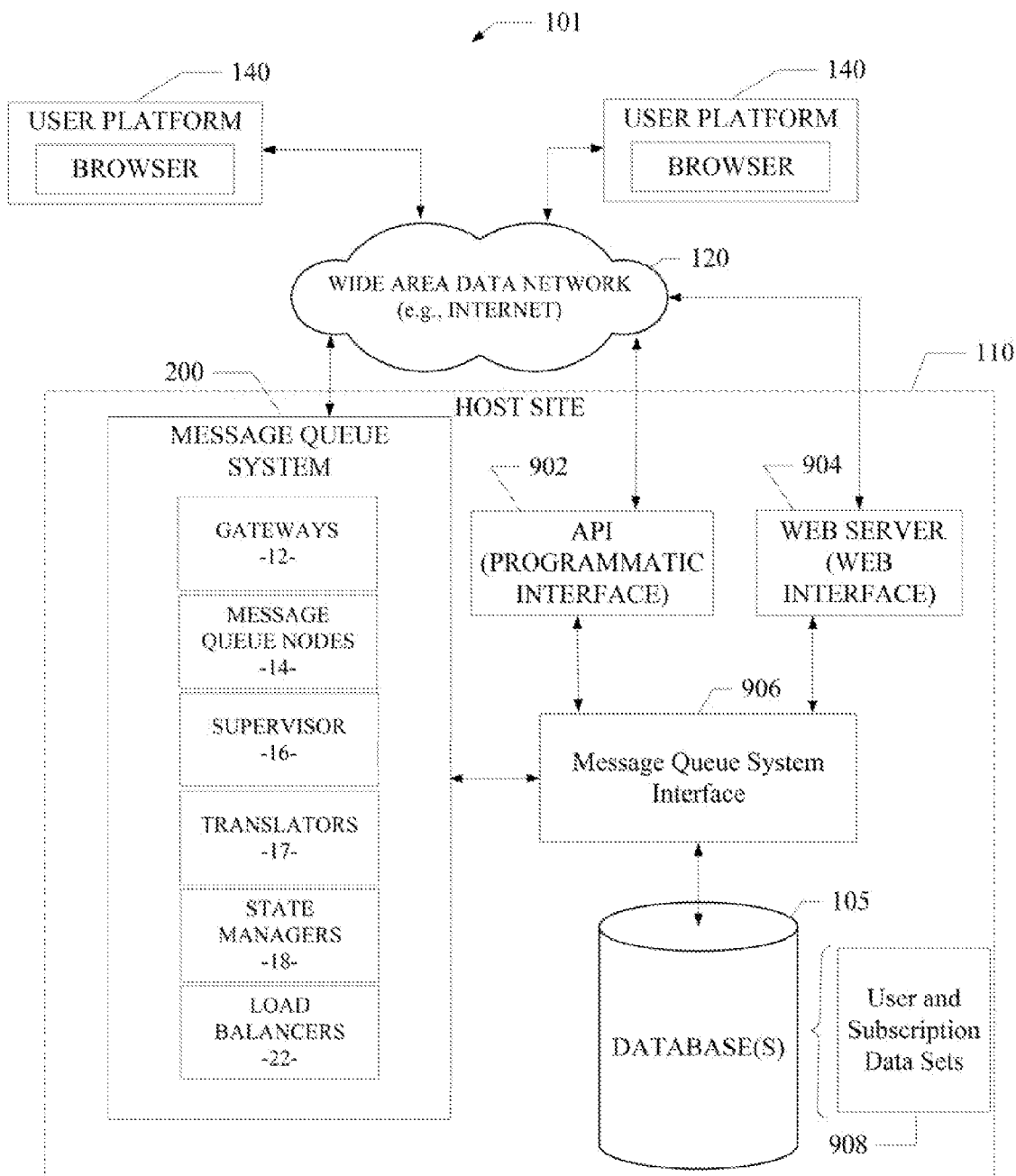
FIG. 9 illustrates another example embodiment of a networked system in which various embodiments may operate.

Referring now to FIG. 9, another example embodiment 101 of a networked system in which various embodiments may operate is illustrated. In the embodiment illustrated, the host site 110 is shown to include the message queue system 200. The message queue system 200 is shown to include the functional components 12 through 22. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the message queue system 200 either directly or via an interface 906. The message queue system 200 may be configured to access a data storage device 105 either directly or via the interface 906.

Figure 10:
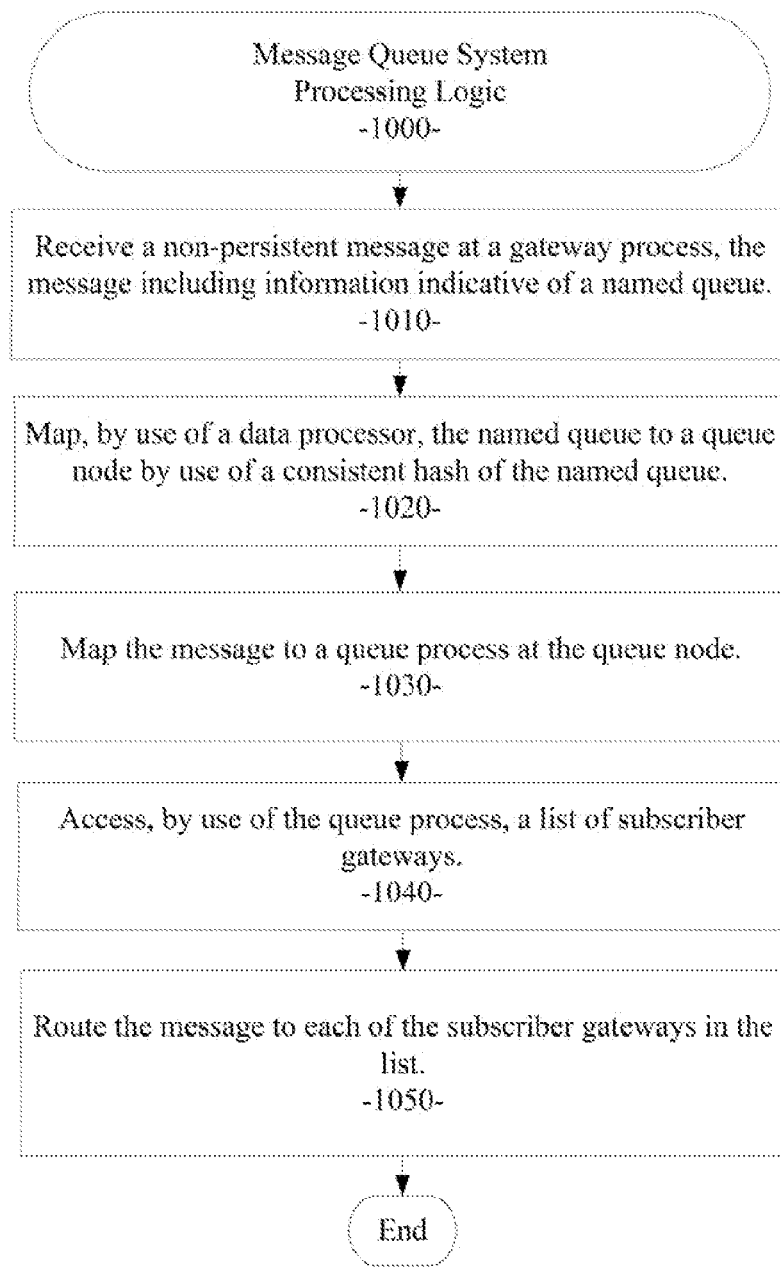
FIG. 10 is a processing flow chart illustrating an example embodiment of processing in a message queue system as described herein.

FIG. 10 is a processing flow diagram illustrating an example embodiment of a message queue system as described herein. The method of an example embodiment includes: receiving a non-persistent message at a gateway process, the message including information indicative of a named queue (processing block 1010); mapping, by use of a data processor, the named queue to a queue node by use of a consistent hash of the named queue (processing block 1020); mapping the message to a queue process at the queue node (processing block 1030); accessing, by use of the queue process, a list of subscriber gateways (processing block 1040); and routing the message to each of the subscriber gateways in the list (processing block 1050).

Figure 11:
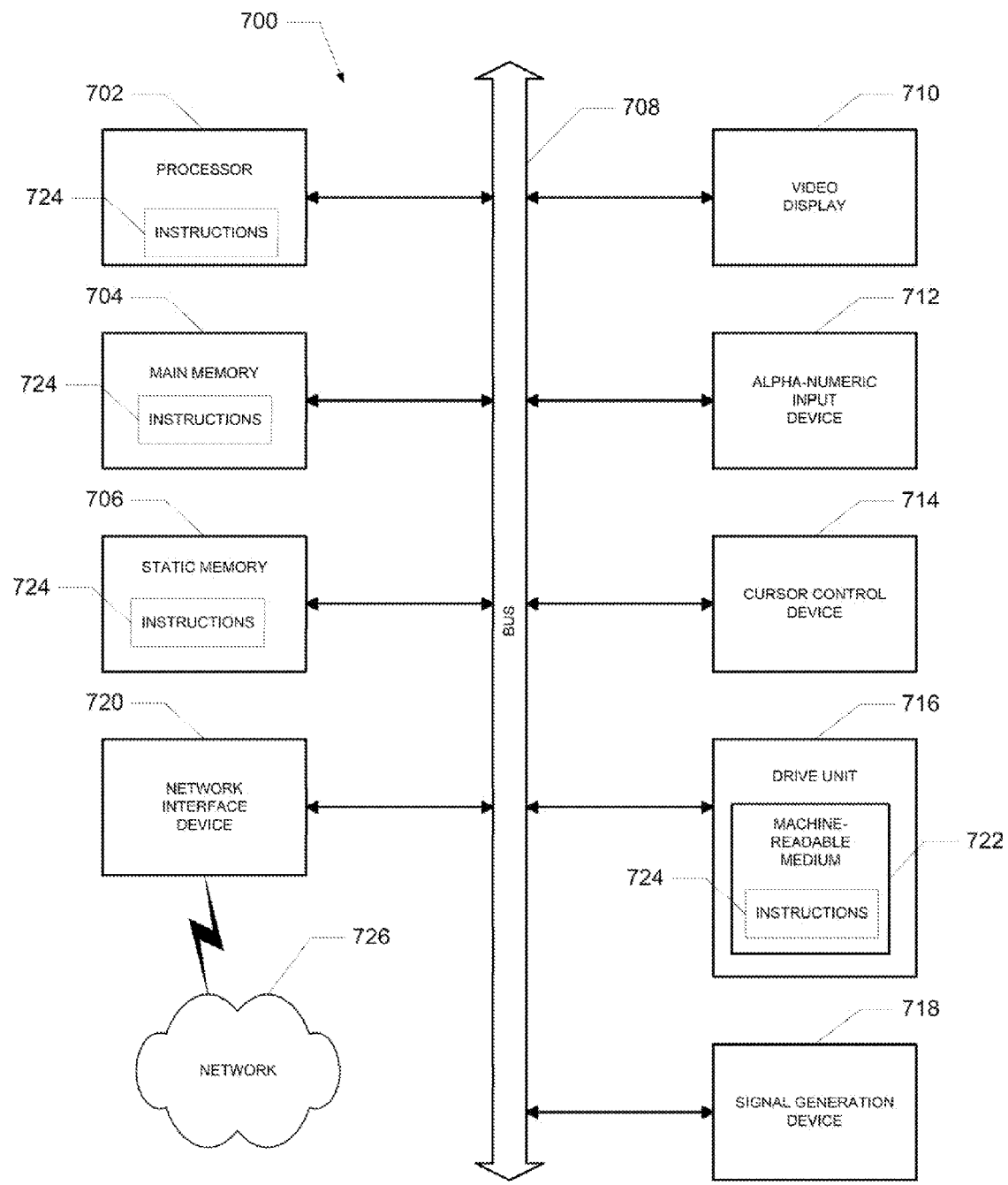
FIG. 11 shows a diagrammatic representation of machine in the example form of a computer system within which a set of instructions when executed may cause the machine to perform any one or more of the methodologies discussed herein.

FIG. 11 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium, or combination of transitory media collaborating to create a non-transitory or semi-non-transitory medium, that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a non-persistent message at a gateway process, the message including information indicative of a named queue to which the message is to be sent;
mapping, by use of a data processor, the named queue to a queue node by use of a consistent hash of the named queue, the mapping including generating a hash of a portion of the received message corresponding to the information indicative of the named queue and using a portion of the generated hash to identify a corresponding queue node, the mapping being performed by a queue node mapper separate from the queue node;
mapping the message to a queue process at the queue node;
accessing, by use of the queue process, a list of subscriber gateways; and
routing the message to each of the subscriber gateways in the list.

2. The method as claimed in claim 1 including maintaining a persistent connection between a gateway and a client.

3. The method as claimed in claim 2 including registering the client as a listener for the named queue.

4. The method as claimed in claim 3 wherein the registering includes providing a message handler callback.

5. The method as claimed in claim 1 including using a supervisor process to manage the mapping of the named queue to the queue node.

6. The method as claimed in claim 1 including mounting message streams and state streams in the queue node.

7. The method as claimed in claim 1 including migrating a state of the queue node to a new queue node in a hot add node process.

8. The method as claimed in claim 1 including receiving the non-persistent message at the gateway process via a translator process.

9. The method as claimed in claim 1 including using a state manager service to update a state of the queue node.

10. The method as claimed in claim 1 including subscribing a user to a system-chat queue and as buddy-state queue at login time.

11. A system, comprising:
a data processor;
a network connection, in data communication with the processor, for access to a network; and
a message queue system module, executable by the processor, to:
receive a non-persistent message at a gateway process, the message including information indicative of as named queue to which the message is to be sent;
map the named queue to a queue node by use of a consistent hash of the named queue, the mapping including generating a hash of a portion of the received message corresponding to the information indicative of the named queue and using a portion of the generated hash to identify a corresponding queue node, the mapping being performed by as queue node mapper separate from the queue node;
map the message to a queue process at the queue node;
access, by use of the queue process, a list of subscriber gateways, and
route the message to each of the subscriber gateways in the list.

12. The system as claimed in claim 11 being further configured to maintain a persistent connection between a gateway and a client.

13. The system as claimed in claim 12 being further configured to register the client as a listener for the named queue.

14. The system as claimed, in claim 13 wherein the registering includes providing a message handler callback.

15. The system as claimed in claim 11 being further configured to use a supervisor process to manage the mapping of the named queue to the queue node.

16. The system as claimed in claim 11 being further configured to mount message streams and state streams in the queue node.

17. The system as claimed in claim 11 being further configured to migrate as state of the queue node to as new queue node in a hot add node process.

18. The system as claimed in claim 11 being further configured to receive the non-persistent message at the gateway process via as translator process.

19. The system as claimed in claim 11 being further configured to use a state manager service to update a state of the queue node.

20. The system as claimed in claim 11 being further configured to subscribe a user to a system-chat queue and a buddy-state queue at login time.

21. A non-transitory machine-useable storage medium embodying instructions which, when executed by a machine, cause the machine to;
receive a non-persistent message at a gateway process, the message including information indicative of a named queue to which the message is to be sent;
map the named queue to a queue node by use of a consistent hash of the named queue, the mapping including generating a hash of a portion of the received message corresponding to the information indicative of the named queue and using a portion of the generated hash to identify a corresponding queue node, the mapping being performed by a queue node mapper separate from the queue node;
map the message to a queue process at the queue node;
access, by use of the queue process, a list of subscriber gateways; and
route the message to each of the subscriber gateways in the list.

* * * * *